US00RE50028E

(19) United States
(12) Reissued Patent
Hocker et al.

(10) Patent Number: US RE50,028 E
(45) Date of Reissued Patent: Jul. 2, 2024

(54) BLADE PORTIONER CALIBRATION

(71) Applicant: John Bean Technologies Corporation, Chicago, IL (US)

(72) Inventors: Jon A. Hocker, Redmond, WA (US); Richard D. Stockard, Kirkland, WA (US); George R. Blaine, Lake Stevens, WA (US)

(73) Assignee: JOHN BEAN TECHNOLOGIES CORPORATION, Chicago, IL (US)

(21) Appl. No.: 17/522,695

(22) Filed: Nov. 9, 2021

Related U.S. Patent Documents

Reissue of:

(64) Patent No.: 10,471,619
Issued: Nov. 12, 2019
Appl. No.: 15/004,909
Filed: Jan. 23, 2016

(51) Int. Cl.
*B26D 5/00* (2006.01)
*G01B 11/06* (2006.01)
(Continued)

(52) U.S. Cl.
CPC ..... *B26D 5/007* (2013.01); *G01B 11/06* (2013.01); *G01B 15/02* (2013.01); *G01G 19/00* (2013.01);
(Continued)

(58) Field of Classification Search
CPC ..... B26D 5/34; B26D 5/32; B26D 2210/02
See application file for complete search history.

(56) References Cited

U.S. PATENT DOCUMENTS 3,950,820 A * 4/1976 Duncan ..... A22C 21/0023 452/157
5,163,865 A * 11/1992 Smith ..... A22C 25/18 83/956
(Continued)

FOREIGN PATENT DOCUMENTS

DE 198 20 058 A1 12/1999
EP 1069061 A2 1/2001
(Continued)

OTHER PUBLICATIONS

International Search Report and Written Opinion mailed May 9, 2017, issued in corresponding International Application No. PCT/US2017/014602, filed Jan. 23, 2017, 10 pages.
(Continued)

*Primary Examiner* — Deandra M Hughes
(74) *Attorney, Agent, or Firm* — Christensen O'Connor Johnson Kindness PLLC

(57) ABSTRACT

Calibrating the operation of a cutter used in a portioning system to cut workpieces into portions, wherein the workpiece is carried along a driven conveyance device past a scanner and then to a cutting apparatus. The calibration method employs a correction algorithm to correct for variables or limitations in the condition of one or more components of the portioning system and/or variations or limitations in the operation or operational capabilities of the portioning system. The correction algorithm may also factor in the physical condition, configuration, or composition of the workpieces being portioned, as well as whether the workpieces move on the conveyance device prior to and/or during the portioning operation.

26 Claims, 1 Drawing Sheet

(51) Int. Cl.

| | |
|---|---|
| ***G01B 15/02*** | (2006.01) |
| ***G01G 19/00*** | (2006.01) |
| *B26D 5/32* | (2006.01) |
| *B26D 5/34* | (2006.01) |

(52) U.S. Cl.
CPC ..... *B26D 5/32* (2013.01); *B26D 5/34* (2013.01); *B26D 2210/02* (2013.01)

(56) References Cited

U.S. PATENT DOCUMENTS

| | | | | |
|---|---|---|---|---|
| 5,286,185 | A * | 2/1994 | Tashiro | A21C 3/02 264/145 |
| 5,585,603 | A * | 12/1996 | Vogeley, Jr. | G01G 9/005 177/1 |
| 6,164,174 | A | 12/2000 | Sigurdsson et al. | B26D 7/30 83/365 |
| 6,360,640 | B1 | 3/2002 | Cote | |
| 6,379,464 | B1 * | 4/2002 | Martel | B05B 12/122 118/672 |
| 6,441,321 | B1 * | 8/2002 | Hebenstreit | G01G 11/003 426/496 |
| 7,153,203 | B2 * | 12/2006 | Pfarr | B23K 26/0838 83/72 |
| 7,841,264 | B2 * | 11/2010 | Kim | B26D 7/018 83/13 |
| 8,096,860 | B2 * | 1/2012 | Bolte | A22C 17/002 452/157 |
| 8,688,267 | B2 * | 4/2014 | Blaine | B07C 5/342 434/109 |
| 9,008,824 | B1 | 4/2015 | Blaine et al. | G05B 19/188 700/103 |
| 9,285,213 | B2 * | 3/2016 | Lindee | G01B 11/2545 |
| 10,555,539 | B2 * | 2/2020 | Finnsson | B26D 1/45 |
| 10,869,489 | B2 * | 12/2020 | Blaine | A22C 17/0086 |
| 11,014,257 | B2 * | 5/2021 | Sunter | A22C 17/0093 |
| 11,751,598 | B2 * | 9/2023 | Dragt | B26D 7/32 99/539 |
| 2005/0000344 | A1 | 1/2005 | Bucks | |
| 2005/0032471 | A1 * | 2/2005 | Pfarr | B65G 43/08 452/181 |
| 2005/0154490 | A1 * | 7/2005 | Blaine | B26D 5/005 700/103 |
| 2007/0157776 | A1 * | 7/2007 | Sorensen | A22C 17/0086 83/73 |
| 2009/0018689 | A1 * | 1/2009 | Smith | B23Q 17/2233 700/114 |
| 2013/0152507 | A1 * | 6/2013 | Frazier | B65B 51/065 53/417 |
| 2013/0341156 | A1 * | 12/2013 | Vogeley, Jr. | B65G 43/08 198/340 |
| 2016/0165906 | A1 * | 6/2016 | Lasslop | A23C 19/14 53/493 |
| 2016/0182833 | A1 * | 6/2016 | Debus | G05B 19/402 700/122 |

FOREIGN PATENT DOCUMENTS

| | | | | |
|---|---|---|---|---|
| EP | 2 030 744 | A1 | 4/2009 | |
| EP | 2 572 840 | A2 | 3/2013 | |
| EP | 2 759 205 | A1 | 7/2014 | |
| EP | 2 878 203 | A1 | 6/2015 | |
| FR | 2627423 | A1 | 8/1989 | |
| GB | 2 173 008 | A | 10/1986 | |
| GB | 2 239 787 | A | 7/1991 | |
| GB | 2239787 | A * | 7/1991 | A22C 17/002 |
| GB | 2 331 917 | A | 6/1999 | |
| GB | 2331917 | A * | 6/1999 | B26D 7/30 |
| GB | 2 377 362 | A2 | 1/2003 | |
| GB | 2 409 801 | A | 7/2005 | |
| GB | 2409801 | A * | 7/2005 | A22C 17/00 |
| WO | 2016/083621 | A1 | 6/2016 | |

OTHER PUBLICATIONS

Communication mailed Aug. 19, 2019 issued in corresponding European Application No. EP-21100364, filed Jan. 23, 2017, 5 pages.

Second Written Opinion mailed Feb. 8, 2018, issued in corresponding International Application No. PCT/US2017/014602, filed Jan. 23, 2017, 6 pages.

International Preliminary Report on Patentability mailed May 4, 2018, issued in corresponding International Application No. PCT/US2017/014602, filed Jan. 23, 2017, 30 pages.

Extended European Search Report mailed Oct. 8, 2021, issued in European Patent Application No. EP-21180754.0, filed Jan. 23, 2017, 8 pages.

Chaudhury, M.K., "Viewpoint: A Cut Above the Rest," APS Physics 5(139):1-5, Dec. 2012.

Reyssat, E., et al., "Slicing Softly With Shear," Physical Review Letters 109(24):244301-1-244301-5, Dec. 2012.

Rocchini, C., et al., "A Low Cost 3D Scanner Based on Structured Light," Computer Graphics Forum 20(3):299-308, Sep. 2001.

Smits, A.J., "Drag of Blunt Bodies and Streamlined Bodies," Feb. 1997, <https://www.princeton.edu/~asmits/Bicycle_web/blunt.html> [retrieved Jan. 8, 2016], 4 pages.

* cited by examiner

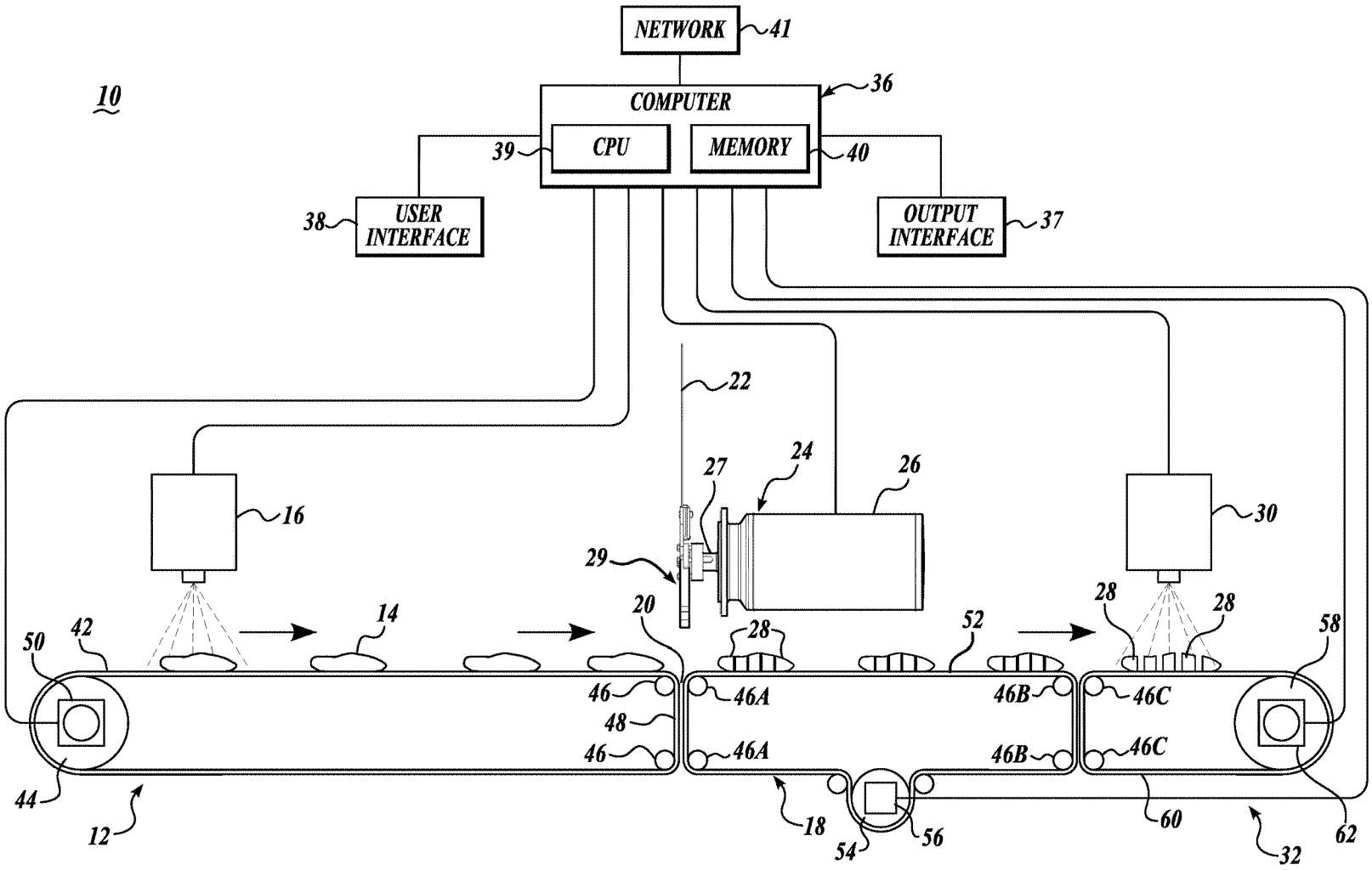
NETWORK
COMPUTER
CPU
MEMORY
OUTPUT INTERFACE
USER INTERFACE
10
12
14
16
18
20
22
24
26
27
28
29
30
32
36
37
38
39
40
41
42
44
46
46A
46B
46C
48
50
52
54
56
58
60
62

BLADE PORTIONER CALIBRATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*The present application is a reissue application of U.S. Pat. No. 10,471,619, issued Nov. 12, 2019, the disclosure of which is incorporated herein by reference.*

TECHNICAL FIELD

The present invention relates to processing workpieces, and more particularly, to portioning workpieces, such as food products, with a blade portioner.

BACKGROUND

Workpieces, including food products, are portioned or otherwise cut into smaller units or portions in accordance with customer needs. Food products are commonly portioned either into uniform or specific sizes, weights, thicknesses, or other specifications. Examples of commonly portioned food products include beef steaks served in restaurants, chicken filets packaged in frozen dinners or chicken patties sized and shaped to fit within specific bun configurations. Fish is likewise routinely portioned into filets or steaks.

Much of the portioning of workpieces, and in particular food products, is now carried out with the use of high-speed portioning machines. These machines use various scanning techniques to ascertain the size, shape, and other physical characteristics of the workpiece as it is being advanced on a moving conveyor. This information is analyzed with the aid of a computer to determine how to most efficiently portion the workpiece into optimum or desired sizes, weights, thicknesses, or other criteria being used. For example, the customer may desire chicken breast portions in two or more different weight(s) or sizes. The chicken breast is scanned as it moves on an infeed conveyor belt, and a determination is made through the use of the computer as to how best to portion the chicken breast to the specific weight(s) desired by the customer.

Portioning of workpieces can be performed by a cutting blade that swings across the conveyor system through a gap defined by the ends of two adjacent conveyors that advance and support the workpieces being portioned. Typically, the blade is attached to a servo motor, which spins the blade very quickly through the gap. The workpiece progresses forwardly on the conveyor belts across the gap, thereby advancing between successive blade revolutions. The blade may make approximately 20 to 30 cuts per second to provide controlled weight, thickness, or size portions, and consequently the timing of the blade passage through the conveyor belt gap must be very tightly controlled.

After the workpiece is scanned, it travels down the moving conveyor to the blade cutter. Using an encoder for monitoring the speed of the conveyor belt, the blade cutter is told by the computer when to cut through the workpiece so as to achieve portions of desired size, for example, desired weights or thicknesses. Thus, a delay occurs between the scanning of a workpiece and the cutting of the workpiece by the rotating cutting blade. This delay can be captured on an encoder count or position down the belt. The difference between the two encoder counts or positions of the workpiece is the "scan-to-cut" delay.

Errors can be caused in the "scan-to-cut" delay and thus the timing of the cutting of the workpiece may not be accurate. These errors can be due to variations in the portioning system operation and structure, as well as variations in the shape or configuration of the workpieces, and also due to the workpiece moving, or the workpiece otherwise being disturbed, before or during the cutting processing. All these variations can lead to the incorrect cutting of the workpiece. The present disclosure seeks to adjust for the foregoing variations by use of one or more calibration procedures, described below.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for calibrating portioning system for portioning workpieces conveyed on a conveyance device past a scanner used to physically characterize the workpiece and then conveyed to a cutting device to cut the workpieces into portions. The method includes portioning representative workpieces using the portioning system, including scanning the workpieces being carried on the conveyor, using the data from the scanner to physically characterize the workpieces, as well as the portions to be cut from the workpieces with respect to one or more selected physical parameters. Next, the sample workpieces are portioned using the cutting device, then physically measuring the cut portions for one or more selected physical parameters, determining the variance between one or more selected physical parameters of the cut portion as determined by the scanner and as physically measured, and then adjusting the operation of the cutting device based on the variance between the one or more selected physical parameters, as determined by the scanner and as physically measured.

In a further aspect of the method, the operation of the cutting device is adjusted by adjusting the timing of the cuts of the workpiece made by the cutting device. In this regard, the cuts of the workpiece made by the cutting device are with respect to a time delay during the travel of the workpiece from the scanner to the cutting device.

In a further aspect of the present method, one or more selected physical parameters include the weight of the portions cut from the workpiece.

In accordance with a further aspect of the present method, a weight correction algorithm is used to correct for variations between the scanned weight of a portion cut from a workpiece and the physically measured weight of the cut portion. In addition, the weight correction algorithm considers one or more physical specifications of the workpiece. Such physical specifications may be selected from the group consisting of the length of the workpiece, the width of the workpiece, the maximum height of the workpiece, the length of each portion to be cut from the workpiece, the distance along the workpiece from the front of the workpiece to the location along the workpiece wherein the portion is being cut, variations in the thickness of the workpiece, and the temperature of the workpiece.

In a further aspect of the present method, the weight correction algorithm corrects for one or more of:

the density of the workpiece, the length of the workpiece, and the distance along the workpiece at which a cut of the workpiece is being made;

the density of the workpiece based on the height of the portion being cut by the cutting device;

the volume of the workpiece, the length of the workpiece, and the distance along the workpiece at which a cut of the workpiece is being made;

the volume of the workpiece based on the height of the portion being cut by the cutting device; and the delay between the scanning of the workpiece and the operation of the cutter based on the overall length of the workpiece and the distance along the workpiece at which the cut of the workpiece is being made.

Calibrating a portioning system for cutting workpieces into portions as the workpiece is carried along a driven conveyance device includes:

determining the position of a workpiece on the conveyance device;

physically characterizing the workpiece;

operating a cutter to cut the workpiece into portions; and calibrating the portioning system to adjust the timing of the operation of the cutter based on one or more of:

variables or limitations in the condition of one or more components of the portioning system and/or the operation or operational capabilities of the portioning system;

the physical condition and/or physical configuration and/or physical composition of the workpieces; and the movement of the workpiece relative to the conveyance device prior to and/or during the operation of the cutter.

Calibrating a portioning system used for cutting workpieces into portions as the workpiece is carried along a driven conveyance device, wherein the workpiece is scanned while traveling on the conveyance device and then the workpiece is cut into portions by a cutter position downstream from the scanning device. The calibration method adjusts the time delay between the scanning of the workpiece and the operation of the cutter based on one or more variations in the condition of the portioning system components and/or one or more limitations in the operation or operational capabilities of the portioning system.

A method is provided for calibrating a portioning system for cutting workpieces into portions as the workpiece is carried along a driven conveyance device. The portioning system includes a scanner for scanning the workpiece being conveyed on the conveyance device and a cutter positioned downstream from the scanner to cut the workpieces being carried by the conveyance device. The portioning system is calibrated by using a weight adjustment algorithm employing one or more variables based on the physical condition, configuration, and/or composition of the workpiece.

In accordance with a further aspect of the present disclosure, the weight adjustment algorithm utilizes one or more factors pertaining to a physical condition, configuration, and/or composition of the workpiece, including one or more of the following:

the type of the workpiece;

if the workpiece is a food product, the type of food product;

if the workpiece is meat, the type of meat;

the length of the workpiece;

the width of the workpiece;

the thickness of the workpiece;

the condition of the perimeter of the workpiece;

the condition of the leading edge of the workpiece;

the variations in thickness of the workpiece;

variations in the height of the top surface of the workpiece;

the temperature of the workpiece;

the density of the workpiece;

if the workpiece is meat, the extent of mottling of the meat; and if the workpiece is meat, the extent of fat within the meat.

DESCRIPTION OF THE DRAWINGS

The foregoing aspects and many of the attendant advantages of this invention will become more readily appreciated as the same become better understood by reference to the following detailed description, when taken in conjunction with the accompanying FIGURE, which is a schematic view of an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein and process steps may be performed in sequences other than as specified.

The present application may include references to directions such as "forward," "rearward," "front," "back," "upward," "downward," "right hand," "left hand," "in," "out," "extended," "advanced," "retracted," "proximal," and "distal." These references and other similar references in the present application are only to assist in helping describe and understand the present invention and are not intended to limit the present invention to these directions.

Also, with respect to the terminology used in the present application, for the most part, the word "parameter" is used to refer to a physical characteristic or feature such as length, width, thickness, weight or color. Also for the most part, the word "specification" refers to a particular parameter value or range, such as a length of between 110 and 120 mm, a weight that is no more than 30 grams, or the color blue. Also, in accordance with the present application, a specific instance of a parameter will have a value, the value may or may not lie within a particular specification. In spite of the foregoing, it is within the scope of the present application to intermingle the use of the term parameter with the use of the term specification. For example, if the word specification is being utilized, this word should be interpreted broadly enough to also encompass the word parameter, and vice-versa. Also, in the present application, the word "characteristic" shall be a generic term that refers to "parameter" and/or "specification."

The present application may include modifiers, such as the words "generally," "approximately" or "substantially." These terms are meant to serve as modifiers to indicate that the "dimension," "shape," or other physical parameter or specification in question need not be exact, but may vary as long as the function that is required to be performed can be carried out. For example, in the phrase "generally circular in shape," the shape need not be exactly circular as long as the required function of the structure or process in question can be carried out. As another example, in the phrase "a substantially flat surface" the surface in question need not be exactly flat, but rather sufficiently flat that required function or requirement of the surface can be achieved.

In the following description, various embodiments of the present disclosure are described and illustrated. The systems, assemblies, apparatus and steps described and illustrated may be identified in the various embodiments by the same part number, but with an alpha suffix or other suffix. The descriptions of the parts/component steps of such systems, assemblies, apparatus, and methods that are the same or similar are not repeated so as to avoid redundancy in the present application.

The FIGURE schematically illustrates a portioning system 10 suitable for implementing an embodiment for the present disclosure. The portioning system 10 includes a first conveyor 12 for carrying workpieces (also "work products" or "products") 14 to be portioned past a first scanning system 16 for scanning the workpieces prior to portioning. A second conveyor 18 is positioned closely adjacent the end of the first conveyor 12, thereby to define a narrow gap 20 therebetween. A cutting knife or blade 22 of a cutting device 24 is rotated through the gap 20. The cutting device 24 includes a servo motor 26 for powering the blade 23 to cut the workpieces 14 into desired units or portions 28. The blade 22 is mounted on the drive shaft 27 of the servo motor 26 with a mounting assembly 29.

An optional second scanning system 30 may be positioned downstream of the cutting device 24 to scan and physically characterize the portions 28 as well as the nature, including the quality, of the cuts of the workpiece 14 performed by the cutting device 24. A third conveyor 32, operating at a higher speed than the second conveyor 18, receives the cut portions 28 from the second conveyor. The higher speed of the third conveyor 32 causes the portions to be separated so that the individual portions 28 can be analyzed, as well as the cuts made on the portions. The conveyors 12, 18 and 32 and the scanning systems 16 and 30, and the cutting device 22 are coupled to and controlled by a computer 36 (also "processor"). The computer may include an output interface or display 37, as well as a user input interface 38 (keyboard, mouse, etc.), a CPU 39, memory units 40, and other components that are commonly included in or used with computers. The computer can be connected to a network 41. Also, rather than employing a computer 36 specifically for portioning system 10, a network computing system can be used for this purpose instead.

Generally, the scanning systems 16 and 30 scan the workpieces 14 and portions 28 to produce scanning information representative of the physical characteristics of the workpieces/portions and forwards the scanning information to computer 36. The computer 36 analyzes the scanning data to develop the physical characteristics or parameters of the workpieces/portions, for example, their size, shape, length, width, thickness, etc. The computer 36 also develops a thickness or height distribution of the scanned workpiece/portion as well as area and/or volume distributions of the workpieces/portions. The weight of the workpiece/portions can be determined by using an assumed density for the workpieces/portions.

The computer can model the workpiece 14 to determine how the workpiece might be portioned into end product sets composed of one or more portions of specific physical criteria, including, for example, weight, shape, thickness, length, width, etc. In this regard, the computer is able to factor in defects found in the workpiece during the scanning process. Such defects may include local discontinuities (including voids), foreign material and undesirable material in the workpiece, for example, bones, gristle, or fat in meat products. With all of these criteria and factors in mind, the computer determines how the workpiece may be portioned into one or more end product sets. The computer then controls the cutting device 24 as well as the speeds of the conveyors 12 and 18 to portion the workpiece according to selected end product or portion sets.

The scanning system 16 may be of a variety of different types, including a video camera to view workpiece 14 illuminated by one or more light sources such as a laser. Light from the laser source is extended across the moving conveyor belt 42 to define a sharp shadow or light stripe line, with the area forwardly of the transverse light beam being dark. When no workpiece 14 is being carried by the infeed conveyor 12, the shadow line/light stripe forms a straight line across the conveyor belt. However, when a workpiece 14 passes across the shadow line/light stripe, the upper, irregular surface of the workpiece produces an irregular shadow line/light stripe as viewed by a video camera directed diagonally and downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe. The length of the workpiece is determined by the distance of the belt travel that the shadow line/light stripes are created by the workpiece. Such distance is measured by the encoder 44

In lieu of a video camera, the scanning station may instead utilize an x-ray apparatus for determining the physical characteristics of the workpiece including its shape, mass, and weight. X-rays may be passed through the workpiece in the direction of an x-ray detector (not shown). Such x-rays are attenuated by the workpiece in proportion to the mass thereof. Scanner system 16 includes a generator to irradiate the workpiece 14 to be scanned with x-ray radiation and a receiver to receive the attenuated radiation. The receiver portion can be integral with the generator.

Attenuation of the x-rays can occur by passing through the workpiece or by reflection from the workpiece. When radiation passes through the workpiece, a certain amount of radiation is absorbed by the workpiece through which it passes. Therefore there will be a relationship between the amount of radiation sent to the workpiece and the amount of radiation received after it has passed through the workpiece. The cause of absorption is believed to reside in the chemical bonds within the molecules of the workpiece. Radiation once attenuated can be collected and converted into a useable form. Photodiodes, for example, may be used to convert an amount of radiation in the visible range into a voltage or current signal. For x-rays, a scintillating material may be used to generate visible light capable of detection by a photodiode. This method is described in U.S. Pat. No. 5,585,603 to Vogeley, Jr., which is herein incorporated by reference.

The foregoing scanning systems are known in the art and, thus, are not novel per se. However, the use of these scanning systems in conjunction with the other aspects of the described embodiments of the present disclosure are believed to be new.

The conveyor 12 carries the workpieces 14 beneath scanning system 16 and then to cutting device 24. As noted above, the second conveyor 18 is spaced a short distance from the end of conveyor 12 to define a gap 20 therebetween through which cutting blade 22 rotates through to portion the workpieces 14 into portions 28. The conveyor 12 may be of various constructions, for example, the belt 42 of the conveyor may be of solid construction or the belt may be composed of segments linked together, with chains extending along the sides of the belt to be driven by sprockets. In the FIGURE, belt 42 is illustrated as a solid belt that is driven by drive roller 44. At the opposite end, idler rollers 46 guide the belt so as to constrain the belt to define a vertical run 48. An encoder 50 is associated with drive roller 44 to monitor the rotational speed of the drive roller, and thus the linear speed of the belt 42 moving towards gap 20.

The construction of conveyor 18 may be substantially the same or substantially similar to the construction of conveyor 12, and thus will not be entirely repeated here. However, it is noted that the belt 52 of the second conveyor 18 is driven a drive roller 54. Also, the speed of the drive roller 54 is monitored by an encoder 56 that is in communication with computer 36.

The construction of the third conveyor 32 may be similar to conveyors 12 and 18. In this regard, a drive roller 58 powers the belt 60 of the third conveyor, and the speed of the drive roller 58 is monitored by an encoder 62.

The encoder information is used to determine when the workpiece 14 is sensed by the scanner 16, and knowing the speed of the belt 42 from the encoded data, the computer 36 can compute when in time the workpiece will reach the rotating cutting blade 22. The time delay between the sensing of the workpiece 14 by the scanner 16 and the workpiece reaching blade 22 may not always be exactly constant due to system variables and variations. For example, the servo-motor used to drive the conveyor drive roller 44, though generally very accurate, may exhibit some variation in speed. Further, the conveyor belt 42 may stretch or contract somewhat from its nominal condition due to age, temperature, tension load placed on the belt, etc. Also, some slippage may occur between the outer circumference of the drive roller 44 and the belt 42. In addition, if the belt 42 is of a segment and chain construction, there can be variations in the construction of the belt segments, as well as wear in the chain and the chain drive sprocket. Accordingly, the belt 42 may not travel between scanner 16 and cutting blade 22 in exactly uniform speed. If a variation occurs in the travel speed of the belt 42, then the locations of the cuts made in workpiece 14 by blade 22 may not be at the location(s) desired.

Another system condition that can cause the delay period from scanning to cutting to be inaccurate is due to transfer of the workpiece 14 from conveyor 12 to conveyor 18. During this transfer, and also due to the existence of gap 20, the workpiece is not always fully supported from below. As such, the workpiece may slump into the valley defined by the adjacent ends of the two conveyors and so the shape of the workpiece as it is being sliced by blade 22 changes in comparison to the shape of the workpiece as was seen by scanner 16. As a consequence, the slicing of the workpiece may be too early or too late. It would be desirable to correct for the cutter timing error ("scan-to-cut" delay) caused by end-to-end conveyor transfer of the workpiece.

Other system-based errors in the timing of the cutting of the workpiece can be due to the calibration of the scanner not being current or correctly calibrated. Further, the calibration of the encoder 44 may also need to be updated or corrected. Moreover, the value of the constants employed in the encoder software may not be accurate, due to several reasons, including operator error, driver roller wear, belt wear, etc. Similarly, the constants used in the scanning software may not be accurate due to various reasons, including operator error, and general software bugs. etc. It is desirable to be able to correct for these system based errors so that the cutting blade 22 cuts the workpieces 14 in the correct manner.

Further system-based errors can be due to the limitations of the optical components used in the scanning system. Distortions of the workpiece can be caused by limitations of lenses used in the scanner, dirty or wet windows covering the lens, etc. Further, the perspective view utilized by the scanner can also distort the workpiece being scanned. These limitations in the components and operation of the scanner can be at least partially compensated for a calibration of the scanner, as well as by adjustment of the scan-to-cut delay of the portioning system 10.

The physical configuration and/or composition of workpieces 14 can lead to scanning inaccuracies or errors, which thereby affects the accuracy of the cuts made by the cutting blade 22. In this regard, the scanner detects the leading edge of the workpiece and thereby establishes the location of the workpiece on the conveyor. This information is used to set the scan-to-cut delay, thereby telling the cutting device 24 when to activate blade 22. However, the leading edge of the workpiece may be jagged, ragged, or otherwise not perfect. As such, the leading edge detected by the scanner may not correlate very accurately with the "effective" leading edge of the workpiece in terms of determining the "start" of the workpiece for establishing the scan-to-cut delay or in terms of analyzing the workpiece for physical configuration including length and volume.

Moreover, depending on the type of product comprising the workpiece, for example, the type of meat food product being portioned, the workpiece may tend to have one or more abrupt edges, tapered edges, undercut edges, hollow areas or depressions underneath the workpiece, all of which the scanner may not be able to properly characterize so as to provide an accurate model of the physical configuration of the workpiece being scanned. If that occurs, then likely the cutting blade will not make cuts in the workpiece at the correct location so as to provide portions of desired sizes, weights, etc. It is known that certain types and cuts of meats have more or less of a tendency to have one or more of the above-noted physical conditions.

Also, the overall height and length of the workpiece may have a bearing on the accuracy of the model of the workpiece resulting from scanning. For example, if the scanner produces a constant error in ascertaining the height of the workpiece or the length of the workpiece, then the significance of the error may depend on the overall height of the workpiece or the overall length of the workpiece. For thinner workpieces, an error in height of the workpiece will result in a larger percentage error in the height of the workpiece as determined by the scanner. The same holds true for the length of the workpiece. If the workpiece is relatively short and the scanner is miscalibrated or otherwise provides a constant fixed error in the length of a workpiece, then for shorter workpieces the percentage of the error will be greater than the longer workpieces.

The abruptness of the rise and fall of the upper surface of the workpiece may also lead to scanning errors. If the top surface of the workpiece rises and/or falls abruptly, it may be difficult for the scanner to accurately determine the exact height of the workpiece across the entire width thereof, especially if the height of the workpiece varies significantly across the workpiece. This may be because limitations in the scanning software as well as limitations in the optics of the scanning system. Also, an uneven top surface can block the "line-of-sight" of the scanner, causing the scanner to not be able to accurately determine the height of the workpiece on the far side of a high point in the top surface of the workpiece. As a result, an error can occur in the characterization of the workpiece by the scanner for abrupt rising and falling of the top surface of the workpiece.

The foregoing errors caused by the height of the workpiece, the length of the workpiece and/or the abruptness of the rise and fall of the workpiece can all be adjusted for in a system ("weight correction") algorithm used in conjunction with the algorithm used to determine the weight and/or weight distribution of the workpiece. The same is true for correcting for the existence of abrupt edges, tapered edges, undercut edges, hollow areas, etc., of a workpiece, especially since such physical condition(s) of the workpiece may be dependent on the type and/or size and/or shape of the work product being sliced, for example, the type of meat product being sliced, for example, a beef prime versus a chicken breast versus a salmon filet. It is possible to employ parameters for these variables in a weight correction algorithm used in conjunction with the weight determination algorithm based on data from the scanner 16.

The workpiece composition can also lead to scanning errors due to limitations of the scanning system. As in all optical methodology, reflective or transparent surfaces can cause difficulties and/or inaccuracies, as can translucent workpieces as well as workpieces that absorb light energy. If the workpiece is reflective, the workpiece can cause light to be reflected either away from the camera rather than back to the camera. In either situation, the dynamic range of the camera can be exceeded.

Further, certain meat products, such as chicken, can be highly reflective. The level of reflectance can depend on numerous factors, including the age of the chicken, whether the chicken surface is moist, whether the chicken is positioned so that the "cut" carcass side of the meat or the membrane-covered "skin" side of the meat is toward the camera. These variations can result in differences in the scan determined height of the workpiece, which then affects the calculated volume of the workpiece.

If the workpiece is translucent, light can penetrate through the workpiece and then reflected from the interior of the workpiece some distance below the upper surface of the workpiece. In this situation, the height of the workpiece as seen by the scanning camera may be lower than the actual height of the workpiece.

Also, in some types of workpieces, including translucent workpieces, the light from the light source may scatter below the top surface of the workpiece rather than reflecting back to the scanning camera. Again, the perceived height of the workpiece would be lower than the actual height of the workpiece in this situation. As such, a corrective factor based on the light reflectance, translucence and absorbance of the workpiece can be highly desirable in a correction algorithm to correct the volume of the workpiece as determined from the scanner (or the weight of the workpiece determined by factoring in the density of the workpiece to the measured volume of the workpiece by scanning).

A further source of error in the timing of the cuts made by cutting blade 22 stems from movement of the workpiece on the conveyor 12 and/or 18 due to disturbances or other similar causes. Disturbances can originate from vibration of belt 42 due to, for example, operating at a harmonic frequency of conveyor 12, worn drive roller bearings, misalignment of drive and/or idler rollers on the belt 44, or a piece of product stuck on a roller that supports or drives the belt 44, and thus impacts the belt once per revolution, an out of balance blade 22 or holder assembly 29. If the vibration of belt 42 is significant enough, the workpieces may move longitudinally relative to the belt or change in shape (for example, settle or become flatter), thereby causing a change in the location of the workpiece on the belt as well as in the volume distribution of the workpiece. Consequently, the cuts made in the workpiece by blade 22 may be at incorrect locations resulting in portions 28 that do not meet required specifications.

Further, if the cutting blade 22 is set at too high of a rotational speed, a workpiece such as meat may actually move significantly on the conveyor. During the initial stages of cutting, workpieces such as meat, are compressed by the cutting blade, with the extent of meat deformation caused by compression dependent in part on the speed of the blade. The compression forces caused by the knife blade 22 propagate through the meat at a rate of propagation depending on the characteristics of the meat, including its density. Nonetheless, if the blade 22 moves too fast, the energy from the compressive forces rapidly travels through the meat workpiece, like a shockwave, which can cause the meat to move significantly on the conveyor belt. If this occurs, the location of the cuts made on the workpiece 14 will be inaccurate.

Conversely, too slow of a blade speed can distort a workpiece during the initial stage of cutting the product that, as the product moves on the belt during the cutting process, movement and inaccurate cuts result.

The sharpness or dullness of the cutting knife 22 can also cause a disturbance in the workpiece 14. With a dull blade, more blade force is required to fracture the workpiece located below the blade, for example, a workpiece composed of meat. The shockwave created in the meat by the higher cutting force applied by the blade 22 may cause the meat to move on the conveying surface.

Another source of workpiece disturbance can result from conveyor to conveyor transfer of the workpiece at the gap through which the cutting blade rotates through. The interface between the adjacent ends of the two conveyors forming the blade gap by necessity create a valley extending or indentation across the path of travel of the workpiece. Such valley or indentation will cause the workpiece to shift downwardly into the valley, with the amount of shift depending in part on the stiffness or structural integrity of the workpiece, its temperature, and other factors. Nonetheless, the workpiece may move relative to its position when being fully supported from beneath by a conveyor.

A further source of disturbance of the workpiece can result from the angle of cut made by the blade 22. In the FIGURE, blade 22 is oriented to make a substantially vertical cut through the workpiece 14. However, the position of the blade 22 can be changed so that the cut through the workpiece is at an angle other than normal to the surface of the conveyor belt 42. In this situation, the angle of the gap 20 can be adjusted to correspond to the angle of the cut made by blade 22. Applicants have observed that if the cut angle of the blade 22 is other than 90 degrees to belt 42, as shown in the FIGURE, the workpiece can be disturbed by the action of the blade 21, thereby causing movement of the workpiece longitudinal of the belt and/or a change in the three-dimensional configuration of the workpiece. Such movement or changed configuration can result in errors in the cutting of the workpiece.

Further, workpieces, such as workpiece 14, are commonly cut into a number of portions or segments, such as segments 28, shown in the FIGURE. If the cutting action of blade 22 causes vibration or movement of the workpiece, with each sequential cut, increased error in the cut may occur due to the cumulative effect of the disturbances on the workpiece by the cutting action.

It can be helpful to employ a correction algorithm that can adjust for product disturbances and movements of the workpiece due to the causes discussed above, as well as other causes of product disturbance and/or movement.

A foregoing identified portioning system variables, limitations in the scanning systems, product configuration caused errors, and product disturbances are not intended to be inclusive or exhaustive. System variables, system limitations, product configuration factors, causes of product disturbances and movement other than identified above, nonetheless can be corrected for, or accommodated by, calibrating the portioning system 10 to account for such conditions.

A first possible calibration procedure can be used to "fine tune" the "actual" distance between the scanner and the cutting blade, thus the actual "scan-to-cut" delay for the workpiece. As discussed above, such distance may vary due to system variables and variations. In this calibration procedure, the system 10 is set up to cut workpieces in half. Thereafter, the cut halves are weighed. The two halves will likely deviate slight from equal weight. Such deviation can be entered into a control program resident in computer 36 for controlling the timing of blade 22. In this regard, the interval between the workpiece being sensed by scanner 16 and then cut by blade 22 may be increased or decreased as needed to achieve equal weight halves of the cut workpiece.

The portioning system 10 can also be calibrated to adjust for product configuration variations as well as at least some product movements/disturbances. However, some of the product disturbances discussed above will result in "out of specification" portions for which corrective action will need to be taken, including, for instance, altering the speed of the cutting blade to a more optimal level, correcting sources of belt vibration and replacing dull cutting blades. On the other hand, product disturbances due to the angle of the cut made through the workpiece can be used as an independent variable in a weight correction algorithm, as discussed more fully below.

Calibrating the portioning system 10 to adjust for the angle of a cut made in the workpieces as well as inaccuracies of workpiece dimensions, shape, and/or volume distribution due to product type as well as product configuration variables can be addressed by operating the system 10 in a second calibration mode. In the second calibration mode, the system 10 will be set up to cut workpieces into a series of suitably sized strips, perhaps ¾ -inch wide. A series of individual workpieces would be portioned in this manner. The portions would be weighed in the order specified by the calibration program and then such weights entered into the calibration program. The number of workpieces that need to be portioned to achieve an accurate configuration can be determined by the calibration program, which in turn will depend, at least in part, on the variability of the measured weights of the portions.

A computer program, based on the results of the scanning, as well as the measured weights of the individual portions, can set the parameters for a weight correction algorithm for a specific product (workpiece) as well as adjust the time delay between the scan and the operation of the cutting blade. Once the parameters for the weight correction algorithm have been determined, the system 10 can be switched to a production mode wherein the control program for the system using the determined parameters for the weight correction algorithm will automatically correct the timing of each of the cuts made by blade 22 to give accurate portion weights based on the weight correction algorithm. It will be appreciated that the second calibration mode also automatically corrects for inaccuracies in the "scan-to-cut" delay.

The weight correction algorithm can utilize various independent variables as appropriate or desired by the system operator. As an example, the weight correction algorithm could simply depend upon the length of the workpiece and the distance down the workpiece at which the cut is being made. This strategy could correct for scanning errors in determining the length of the workpiece as well as perhaps product disturbances caused by the action of the blade 22 cutting through the workpiece, especially if the cut is being made at an angle to the belt 42 rather than normal to the belt.

Alternatively, the weight correction algorithm could be dependent upon some measure of the average height of the workpiece at any given point down the belt. As such, scanning errors in determining the height of the workpiece can be adjusted for. As another option, the weight correction algorithm could be dependent upon the abruptness of the rise or fall of the workpiece top surface combined with the average height of the workpiece. As discussed above, if the workpiece abruptly rises or falls, the scanned height of the workpiece and thus the volume may not be accurate.

The weight correction algorithm can utilize several independent variables at once, including, for example, the distance down the length of the workpiece combined with the average height of the workpiece and the abruptness of the rise and fall of the top surface of the workpiece. Another independent variable for the weight correction algorithm for use alone or with other correction variables, can be the edge condition(s) of the workpiece, whether sloped, vertical, or otherwise.

The weight correction algorithm can be expressed, at least in the computer 36, as a delay correction algorithm for each cut of a workpiece to correct the delay between the scanning occurs and the subsequent cut of the workpiece. One example of such a "delay" algorithm could be expressed by the formula:

$$\text{Delay}=\text{Delay } 0\times(A+B)\times(x/L)), \text{ wherein}$$

Delay 0=the nominal "scan-to-cut" delay as measured by a tape measure, ruler, or other physical technique.

A=equation constant

B=equation constant x=the distance down the workpiece where the cut is being made L=the overall length of the workpiece.

Alternatively, with respect to the computer, the weight correction algorithm can be expressed as a correction of the density or volume of the workpiece for each cross-section cut from the workpiece. One example of a density correction algorithm could be the following:

$$\text{Density}=\text{Density } O\times(A+B)\times(x/L)), \text{ wherein:}$$

Density O=actual measured density of the workpiece

A=equation constant

B=equation constant x=a distance down the workpiece at which the cut is being made L=the overall length of the workpiece Rather than correcting for density, the correction algorithm can be expressed in terms of a volume correction. As such, the equation above would be the same except Density O would be replaced by Volume O, which would be the actual measured density of the workpiece.

Thirdly, the weight correction algorithm could be expressed in the computer as a height correction algorithm, correcting for the height of each cross-section cut from the workpiece.

An example of an algorithm in this regard is the following:

$$\text{Density}=\text{Density O}\times((A+B)\times H),\ \text{wherein:}$$

Density O=the actual measured density of the workpiece.

A=equation constant

B=equation constant

H=the height of the portion (preferably at the middle of the portion) being cut.

Rather than expressing the above equation in terms of density, the equation can be expressed in terms of volume. In that regard, the Density O would be replaced by Volume O, which is the actual measured density of the workpiece.

Regardless of how the weight correction algorithm is expressed in the computer with respect to system 10, the actual nature of the correction will always be to correct the delay (per piece) between scanning and cutting because each of the portions, and thus weights of the portions, is controlled solely by when the blade passes through the workpiece.

The foregoing equations are not to be exclusive. In this regard, other specifications or measures could be used in the correction algorithms that may be more appropriate for the type of workpiece being portioned, including the type of meat being portioned, for example, steaks versus chicken nuggets versus salmon fillets. Also, additional or different set of measures or factors could be utilized, for example, a set composed of height of the workpiece, distance down the length of the workpiece, the length of the workpiece, as well as the width of the workpiece. Of course, with more factors, likely more equation constants will be required, which may be troublesome in that many regression analysis techniques do not function well in situations with a large number of equation constants and a small number of data points.

As a further matter, although numerous correction parameters or variables have been discussed above and a significant number of such parameters or variables can be employed in a weight correction algorithm, in a production situation, not all of the potential parameters or variables need be employed. As noted above, it is possible to only rely on one or two variables, such as the length of the workpiece and the distance down the workpiece at which a cut is being made. If a sufficient number of test pieces are used in the calibration mode, relying on the length of the workpiece and the distance down the workpiece in the weight correction algorithm can result in accurate portions being cut from the workpiece.

The weight correction algorithms can be executed in various ways in the production mode of system 10 within the portioner program being utilized, depending upon the structure of the portioner program, its data of storage arrangement, as well as perhaps personal preference of the programmer. In this regard, one execution method would be to make corrections to the scanned height, length, width, volume, or weight or density or other physical parameter of a given light stripe progressing down the product length as the product is being scanned.

Accordingly, the collected data with respect to the workpiece simply gets stored as a corrected value. Another execution method of the weight correction algorithm would be to store the objective raw scanned data in a matrix and then construct a second correction matrix that is modified in accordance with the weight correction algorithm.

A third methodology would be to make corrections to the specifications of the workpiece per the weight correction algorithm while the objective raw data from the scanning is being summed thereby to determine the position of the cuts to be made in the workpiece.

A fourth potential methodology would be to create a "delay matrix" as a lookup table. The lookup table is applied to the uncorrected positions of the cut using the raw scanning data. As a consequence, the position of the cuts is then corrected. Of course, other methodologies could be utilized to execute the weight correction algorithm in a production mode in system 10.

While illustrative embodiments have been illustrated and described, it will be appreciated that various changes can be made therein without departing from the spirit and scope of the invention.

Although this specification describes determining the position of a workpiece 14 on conveyor 12 through the use of scanner 16 in conjunction with encoder 50, it will be appreciated that other techniques can be utilized for determining the position of a workpiece on the conveyor. One alternative approach would be to utilize an electronic or optical beam which is "cut" by the workpiece as the workpiece moves on the conveyor. Also, rather than using an encoder 50 associated with drive roller 44, other types of encoders, including optical encoders, can be utilized.

In addition, the foregoing specification illustrates and describes a cutting knife or blade 22 of a cutting device 24, powered by a servo motor 26. The present disclosure can be utilized with other types of cutting devices, including, without limitation, circular saws, radial saws, reciprocating saws, hacksaws, Stryker® saws, oscillating saws, waterjet cutters, laser cutters, or other cutters capable of making the required cuts through the workpiece.

Further, the foregoing description includes examples of specific algorithms that may be utilized in conjunction with the present disclosure. However, as noted above, the present disclosure is not limited to the specific algorithms set forth above. Other algorithms that perform the required function described and/or claimed in the present application may be utilized.

The embodiments of the invention in which an exclusive property or privilege is claimed are defined as follows:

1. A method for calibrating a cutting system for cutting variable-sized food workpieces into portions of selected physical parameters prior to operating the cutting system on a production basis, the cutting system having a conveyance device for conveying variable-sized sample food workpieces past a scanner used to physically characterize the variable-sized sample food workpieces and then to a cutting device to cut the variable-sized sample food workpieces into portions, the method calibrating the time span between when the variable-sized sample food workpieces are scanned by the scanner and the cutting of the variable-sized sample food workpieces with the cutting device, the method comprising:

prior to the operation of the cutting system to cut variable-sized food workpieces on a production basis:

a. scanning variable-sized sample food workpieces at a scanner while being transported on a conveyance device to produce data related to the physical condition and/or physical configuration and/or the physical composition of the variable-sized sample food workpieces;

b. thereafter using the data from the scanner to physically characterize the scanned variable-sized sample food workpieces as well as the portions to be cut from the variable-sized sample food workpieces based on one or more selected physical parameters;

c. thereafter portioning the representative variable-sized sample food workpieces using the cutting device in accordance with the one or more selected physical parameters while being transported on the conveyance device;

d. physically measuring the cut portions for compliance with the one or more selected physical parameters;

e. determining the variance between the one or more selected physical parameters of the cut portions as determined by the scanner and as physically measured;

f. adjusting the calibration of the cutting device by adjusting the time span between the scanning of the representative variable-sized sample food workpieces and operation of the cutting device without altering the speed of the conveyance device, based on the variance of the one or more selected physical parameters of the cut portions as determined by the scanner and as physically measured; and

[g.] *thereafter during the operation of the cutting system to cut variable-sized food workpieces on a production basis* maintaining the adjusted calibration of the cutting system[during the subsequent cutting of the food workpieces on a production basis].

2. The method according to claim 1, wherein the one or more selected physical parameters are the weight of the portions cut from the variable-sized sample food workpiece.

3. The method according to claim 2, further comprising using a weight correction algorithm to correct for variations between the scanned weight of a portion cut from a variable-sized sample food workpiece and the physically measured weight of the cut portion.

4. The method according to claim 3, wherein the weight correction algorithm considers one or more physical specifications of the variable-sized sample food workpiece that are other than the measured weight of the variable-sized sample workpieces.

5. The method according to claim 4, wherein the weight correction algorithm considers one or more physical specifications of the variable-sized sample food workpiece selected from the group consisting of the length of the variable-sized sample food workpiece, the width of the variable-sized sample food workpiece, the maximum height of the variable-sized sample food workpiece, the length of each portion to be cut from the variable-sized sample food workpiece, the [distance along] *length of the portion to be cut from* the variable-sized sample food workpiece from the front of the variable-sized sample food workpiece [to the location along the variable-sized sample food workpiece wherein the portioning cut is being made], variations in the thickness of the variable-sized sample food workpiece, [and] the temperature of the variable-sized sample food workpiece, *the position of the skin of the sample food workpiece relative to the top of the food workpiece, and the condition of an edge of the sample food workpiece.*

6. The method according to claim 3, wherein the weight correction algorithm corrects for one or more of:

the density of the variable-sized sample workpiece, the length of the variable-sized sample food workpiece, and the distance along the variable-sized sample food workpiece at which a cut of the variable-sized sample food workpiece is being made;

the density of the variable-sized sample food workpiece based on the height of the portion being cut by the cutting device;

the volume of the variable-sized sample food workpiece, the length of the variable-sized sample food workpiece, and the distance along the variable-sized sample food workpiece at which a cut of the variable-sized sample food workpiece is being made;

the volume of the variable-sized sample food workpiece based on the height of the portion being cut by the cutting device;

the delay between the scanning of the variable-sized sample food workpiece and the operation of the cutting device, *the delay is* based on the overall length of the variable-sized sample food workpiece and the distance along the variable-sized sample food workpiece at which a cut of the variable-sized sample food workpiece is being made.

7. Calibrating a cutting system for cutting workpieces into portions as the workpiece is carried along a driven conveyance device, the calibration occurring prior to the production operation of the cutting system, comprising:

prior to operating the cutting system to cut workpieces on a production basis:

(a) determining the position of a representative non-production sample workpiece on a driven conveyance device;

(b) physically characterizing the representative non-production sample workpiece;

(c) based on the results of physically characterizing the representative non-production sample workpiece, operating a cutter to cut the representative non-production sample workpiece into portions which are carried along on the driven conveyance device; and (d) calibrating the cutting system to adjust the time span required for the non-production sample workpiece to travel on the conveyance device between the determined position of the representative non-production sample workpieces on the conveyance device and the operation of the cutter without altering the speed of the conveyance device based on one or more of:

(i) variables or limitations in the condition of one or more components of the cutting system and/or in the operation or operational capabilities of the cutting system;

(ii) the physical condition and/or physical configuration and/or physical composition of the representative non-production sample workpiece;

(iii) the movement of the representative non-production sample workpiece relative to the conveyance device prior to and/or during the operation of the cutter; and

[(iv)] (*e*) maintaining the calibration of the cutting system during the production cutting of the workpieces.

8. Calibrating a cutting system according to claim 7, wherein the variations or limitations in the condition of components of the cutting system and/or the operation or operational capabilities of the cutting system include one or more variables selected from the group [consisting of] *comprising*:

(i) variations in the speed of the conveyance device;

(ii) variations in the speed at which the conveyance device is driven;

(iii) whether the conveyance device is of continuous construction or composed of a plurality of sections or segments; and (iv) inaccuracies in determining, or limitation in being able to determine, the position of the representative non-production sample workpiece on the conveyance device.

9. Calibrating a cutting system according to claim 7, wherein the physical condition and/or configuration and/or composition of the workpieces is selected from the group consisting of:

(i) the type of representative non-production sample workpiece;

(ii) if a representative non-production sample workpiece is a food product, the type of food product;

(iii) if the representative non-production sample workpiece is meat, the type of meat;

(iv) the length of the representative non-production sample workpiece;

(v) the thickness of the representative non-production sample workpiece;

(vi) the condition of the perimeter of the representative non-production sample workpiece;

(vii) the condition of the leading edge of the representative non-production sample workpiece;

(viii) variations in the thickness of the representative non-production sample workpiece;

(ix) variations in the height of the top surface of the representative non-production sample workpiece;

(x) the temperature of the representative non-production sample workpiece;

(xi) the density of the representative non-production sample workpiece;

(xii) if the representative sample non-production workpiece is meat, the extent of marbling of the meat; [and]

(xiii) if the representative non-production sample workpiece is meat, the extent of fat within the meat*;*

(*xiv*) *the position of the skin of the non-production sample workpiece relative to the top of the non-production sample workpiece; and*

(*xv*) *the condition of an edge of the non-production sample workpiece.*

10. Calibrating a cutting system according to claim 7, wherein the movement of the representative non-production sample workpiece relative to the conveyance device is caused by one or more of the following:

(i) the speed at which the representative non-production sample workpiece is carried along by the driven conveyance device is not uniform;

(ii) the conveyance device vibrates the representative non-production sample workpiece as the representative non-production sample workpiece is being carried along by the conveyance device;

(iii) the speed at which the cutter cuts the representative non-production sample workpiece;

(iv) the sharpness of the cutter;

(v) whether the representative non-production sample workpiece transfers from one section of a conveyance device to another;

(vi) the angle of cut of the cutter into the representative non-production sample workpiece; and (vii) the number of portions cut from the representative non-production sample workpiece.

11. Calibrating a cutting system according to claim 7, wherein the position of the representative non-production sample workpiece on the conveyance device is determined by a scanning device.

12. Calibrating a cutting system according to claim 11, wherein the limitation in the operation of the cutting system comprises a limitation in the accuracy of the scanning device.

13. Calibrating a cutting system according to claim 7, wherein the representative non-production sample workpieces are physically characterized with a scanning device.

14. Calibrating a cutting system according to claim 13, wherein the limitation in the operation of the cutting system comprises a limitation in the accuracy of the scanning device.

15. Calibrating a cutting system according to claim 13, wherein the limitation of the components of the cutting system comprises limitations in the optical capabilities of the scanning device.

16. Calibrating a cutting system according to claim 7, wherein the cutting system is calibrated by using the cutting system to cut representative non-production sample workpieces into two equal weights as the representative non-production sample workpieces travel on the conveyance device without altering the speed of the conveyance device, weighing the cut halves, and adjusting the timing of the operation of the cutter based on deviations of the cut halves from being of equal weight.

17. Calibrating a cutting system according to claim 7, comprising:

cutting representative non-production sample workpieces into a series of portions, weighing the portions in the order in which the portions were cut; and based on the variations in the weights of the portions cut, adjusting the timing of the operation of the cutter.

18. Calibrating a cutting system according to claim 7, wherein the cutting system is calibrated with the use of a weight correction algorithm taking into consideration one or more physical characteristics of the representative non-production sample workpiece.

19. Calibrating a cutting system according to claim 18, wherein the weight correction algorithm can be expressed as:

a delay correction for each workpiece to correct a delay between the physical characterization of the representative non-production workpiece and the subsequent operation of the cutter;

a correction of the volume of the representative non-production sample workpiece for each portion cut from the representative non-production sample workpiece;

a correction of the density of the representative non-production sample workpiece for each portion cut from the representative non-production sample workpiece; and a correction for the height for the representative non-production sample workpiece for each cross-sectional cut made in the representative non-production sample workpiece.

20. Calibrating a cutting system according to claim 7, wherein the cutting system is calibrated using a weight correction algorithm employing as variables one or more causes of movement of the representative non-production sample workpiece on the conveyance device.

21. Calibrating a cutter system for cutting variable-sized workpieces into portions of one or more physical parameters by first cutting a variable-sized sample workpiece into portions as the representative variable-sized sample workpiece is carried along a driven conveyance device prior to the operation of the cutter system on a production basis, wherein the representative variable-sized sample workpiece is scanned while traveling on the conveyance device at a constant speed with the scanner at a location along the conveyance device, and then the representative variable-sized sample workpiece is cut into portions by a cutter positioned downstream from the scanning device while traveling on the conveyance device, a calibration method comprising, prior to the operation of the cutter system on a production basis, adjusting the time delay period occurring between the scanning of the representative variable-sized sample workpiece and the subsequent operation of a cutter without altering the speed of the conveyance device to accommodate variations in the physical condition of the cutter system components and limitations in the operation or operational capabilities of the cutter system, whereby the adjusted time delay is used during the subsequent production cutting of the workpieces, including with changes occurring to the belt speed for throughput purposes.

22. Calibrating a cutter system according to claim 21, wherein the variations in the physical condition of one or more components of the cutter system and/or one or more limitations in the operation or operational capabilities of the cutter system include one or more variables selected from the group [consisting of] *comprising*:

(i) variations in the speed of the conveyance device;

(ii) variations in the speed at which the conveyance device is driven;

(iii) whether the conveyance device is composed of a unitary conveyance length or composed of a plurality of conveyance length sections; and (iv) inaccuracies in determining the position of the workpiece on the conveyance device via the scanner.

23. A method of calibrating a rotary cutter system for cutting variable-sized workpieces into portions of desired physical parameters by first cutting a representative variable-sized sample workpiece into portions as the representative variable-sized sample workpiece is carried along a driven conveyance device prior to operating the rotary cutter system on a production basis to cut workpieces, the rotary cutter system comprising a scanner for scanning the repreentative variable-sized sample workpiece being conveyed on the conveyance device and a rotary cutter positioned downstream from the scanner to cut the representative variable-sized sample workpieces while being carried by the conveyance device into portions, the scanner being in position along the conveyance device, the method comprising, prior to the operating of the rotary cutter system on a production basis, calibrating the rotary cutter system by:

adjusting the time delay period occurring between the scanning of the representative variable-sized sample workpiece and the subsequent operation of the rotary cutter without adjusting the speed of the conveyance device; and using a weight adjustment algorithm employing one or more variables to accommodate the physical condition, configuration, and/or composition of the representative variable-sized sample workpiece, whereby the adjusted time delay period is used during the subsequent cutting of the workpieces by the rotary cutter system on a production basis, including with changes occurring to the belt speed for throughput purposes.

24. The calibration method according to claim 23, wherein the weight adjustment algorithm utilizes one or more factors pertaining to the physical condition, configuration and/or composition of the representative variable-sized sample workpiece selected from the group consisting of:

(i) the type of representative variable-sized sample workpiece;

(ii) if the representative variable-sized sample workpiece is a food product, the type of food product;

(iii) if the representative variable-sized sample workpiece is meat, the type of meat;

(iv) the length of the representative variable-sized sample workpiece;

(v) the width of the representative variable-sized sample workpiece (vi) the thickness of the representative variable-sized sample workpiece;

(vii) the condition of the perimeter of the representative variable-sized sample workpiece;

(viii) the condition of the leading edge of the representative variable-sized sample workpiece;

(ix) variations in the thickness of the representative variable-sized sample workpiece;

(x) variations in the height of the top surface of the representative variable-sized sample workpiece;

(xi) the temperature of the representative variable-sized sample workpiece;

(xii) the density of the representative variable-sized sample workpiece;

(xiii) if the representative variable-sized sample workpiece is meat, the extent of marbling of the meat; [and]

(xiv) if the representative variable-sized sample workpiece is meat, the extent of fat within the meat*;*

(*xv*) *the position of the skin of the variable-sized sample workpiece relative to the top of the variable-sized sample workpiece; and*

(*vi*) *the condition of an edge of the variable-sized sample workpiece*.

25. The method of claim 1, comprising maintaining the adjusted calibration of the cutting system during the subsequent cutting of the food workpieces on a production basis, including with changes occurring to the belt speed for throughput purposes.

26. Calibrating a cutting system according to claim 7, comprising maintaining the calibration of the cutting system during the production cutting of the workpieces including with changes occurring to the belt speed for throughput purposes.

* * * * *